United States Patent [19]

Berger

[11] Patent Number: 4,914,691
[45] Date of Patent: Apr. 3, 1990

[54] TELEPHONE DIALING ARRANGEMENT

[75] Inventor: Stephan Berger, Oberbuchsiten, Switzerland

[73] Assignee: Ascom Autophon AG, Solothurn, Switzerland

[21] Appl. No.: 287,147

[22] Filed: Dec. 21, 1988

[30] Foreign Application Priority Data

Dec. 22, 1987 [CH] Switzerland .......................... 4985/87
Dec. 1, 1988 [CH] Switzerland .......................... 4455/88

[51] Int. Cl.$^4$ ............................................. H04M 1/27
[52] U.S. Cl. .................................. 379/357; 379/354; 341/23
[58] Field of Search ............... 379/355, 357, 356, 354, 379/216, 368; 341/23; 40/360, 584, 494, 595, 615, 336, 337, 360, 383, 379

[56] References Cited

U.S. PATENT DOCUMENTS

| | | | |
|---|---|---|---|
| 4,030,094 | 6/1977 | Anderson | 341/23 |
| 4,275,273 | 6/1981 | Ts'Ao | 379/355 |
| 4,278,845 | 7/1981 | Chiou | 379/355 |
| 4,595,798 | 6/1986 | Brodbeck | 379/357 |
| 4,661,976 | 4/1987 | Basch | 379/355 X |
| 4,741,119 | 5/1988 | Baryla | 40/594 |
| 4,771,557 | 9/1988 | Bowman | 40/594 X |

FOREIGN PATENT DOCUMENTS 0158294 10/1985 European Pat. Off. .
3432270 3/1986 Fed. Rep. of Germany .

OTHER PUBLICATIONS

Bell Laboratories Record, vol. 59, No. 4, Apr. 1981, pp. 117–122, Hall, N. R. et al., "TOUCH-A-MATIC S Telephone, Styled for the . . . ".

Primary Examiner—James L. Dwyer
Attorney, Agent, or Firm—Oblon, Spivak, McClelland, Maier & Neustadt

[57] ABSTRACT

One of a pack of flexible cards is removed from a container and placed in a recess in a telephone set. The cards serve as small, portable directories for a plurality of subscriber numbers. Four repertory buttons take the form of a touch-sensitive keypad and are disposed in the bottom of the recess under the respective inscription areas of the card. An electronic telephone number memory is built into the telephone set together with a microprocessor and a line and dialing unit. The cards further include either a combination of notches as a four-bit card identification or an optical three-bit identification. The notches are detected by electromechanical feelers in the recess and, together with the repertory buttons, determine the storage addresses of the telephone numbers. In the case of optical identification, each card comprises an inscription carrier and, adhering thereto, a transparent cover film which can be removed and replaced a number of times.

6 Claims, 2 Drawing Sheets

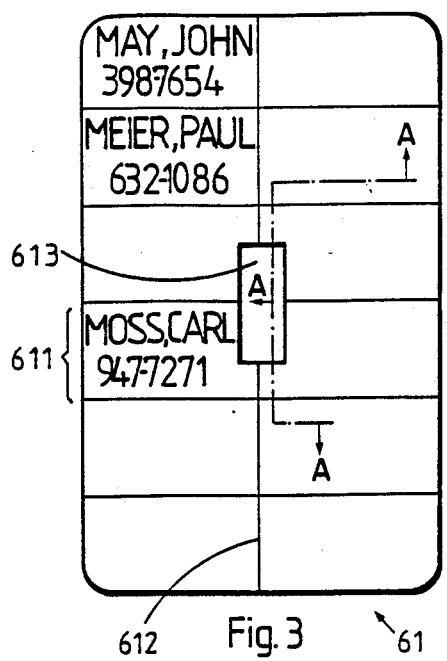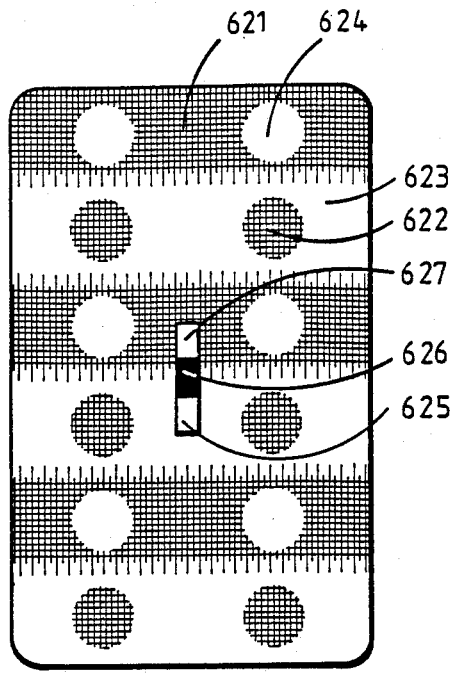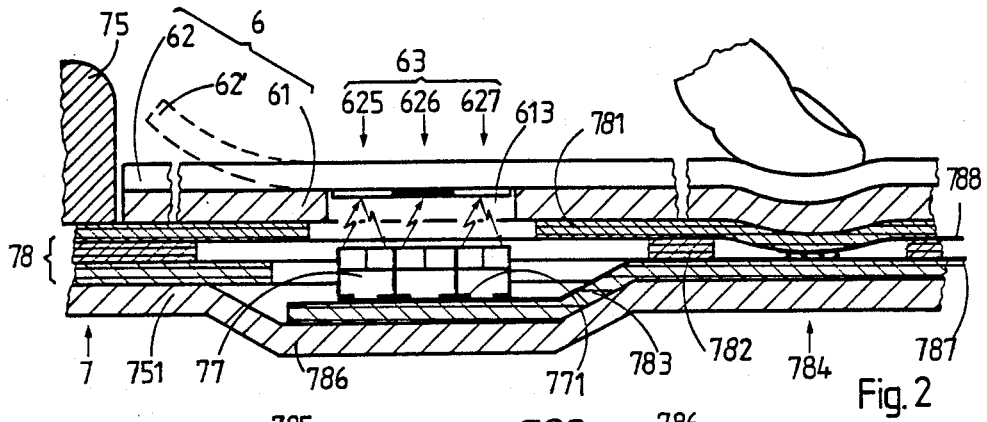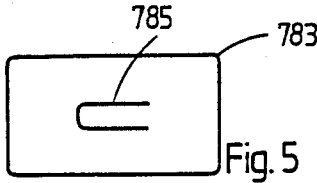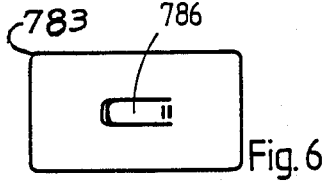

TELEPHONE DIALING ARRANGEMENT

This invention relates to telephone equipment, and more particularly to a telephone dialing arrangement for the automatic dialing of personal, previously stored telephone numbers, of the type having a set of data carriers in sheet form on which appear a certain number and arrangement of areas in which telephone numbers, names, or other characteristics of important subscribers can be entered, each data carrier having always at the same location a machine-readable identification means differing from every other data carrier of the set; a telephone set having a receiving means for insertion of at least one data carrier, having an arrangement of repertory buttons and reading device which corresponds to the arrangement of the areas and the identification means on the data carrier relative to the position of the receiving means; electronic memory means having at least as many storage locations as the sum of the areas on all data carriers of the set, the read-out identification means and the signals of the repertory buttons determining the addresses of the storage locations; and a control unit having a line unit and speech unit for controlling the reading, storing, dialing, and speech operations.

The invention further relates to a card for use in the foregoing dialing arrangement.

One prior art arrangement of this type operates with speed-calling numbers 00 through 19 which are preprinted on a card having twenty lines or areas. The user enters therein the names of the most important called parties, and he stores their telephone numbers by keying in a storage command and the speed-calling number. All that is then needed for dialing is a dialing command and the speed-calling number.

An arrangement operating on the basis of the well-known bar code for the automatic speed calling of hundreds of subscribers is proposed in the co-pending U.S. patent application Ser. No. 244,071 assigned to the present assignee.

Since mix-ups in ascertaining and entering the speed-calling number may occur in the first prior art arrangement, automatic dialing by means of repertory buttons has been introduced. Such apparatus is described in an article by N. R. Hall et al., "TOUCH-A-MATIC® is telephone—styled for the residence market," *Bell Laboratories Record*, Murray Hill, N.J., Vol. 59, No. 4 (April, 1981), pp. 117-122. Here a sheet having twelve preprinted areas is laid on a panel on top of the apparatus. At the right of each area there is an aperture through which a repertory button protrudes; this button determines the storage address for the telephone number both for storing and for automatic dialing. A drawback of this apparatus is the small capacity of twelve names or telephone numbers.

If the number of important called parties is greater, this need can be met in various ways. The simplest solution is to enlarge the surface of the apparatus so that more rows of repertory buttons with associated name areas can be disposed next to one another. Naturally, such a telephone set takes up more room and costs more. Thus, a dialer according to U.S. Pat. No. 4,275,273 already has a hundred repertory buttons. In order that they may be used for even more telephone numbers, the affixing of paper name-strips between the rows of buttons represents a move into the third dimension. The strips are moved into reading position by hand, whereby the key signals are simultaneously switched between the hundreds memory groups.

Proposed in U.S. Pat. No. 4,661,976 is an "electronic telephone book" as an accessory to the actual telephone set. Between two rows of repertory buttons there is a holder for a loose-leaf notebook divided into columns and lines. Each page is provided with a tab projecting to the right or left when the notebook is opened, as in a thumb index. Depending on the page to which the notebook is opened, more tabs project at the bottom left or top right; this distribution is scanned by two rows of photoelectric cells under the tabs and supplied to the central unit as page-number data. The line data are produced as soon as one of the repertory buttons is actuated. The memories are addressed accordingly during storing or automatic dialing.

It is obvious that such accessory equipment is relatively expensive. The same applies to numerous other proposals where in some cases the electric page information of the directories must also be set mechanically by hand, e.g., as in U.S. Pat. Nos. 4,278,845 or 4,595,798.

European patent application publication No. 0 158 2294 discloses a telephone answering apparatus wherein various kinds of elastic user films are to be laid over the keyboard for carrying out different switching functions with the same keyboard. Given as examples are films for entering a remote polling code number, for dictating an announcement on tape, for entering the time, and for entering telephone numbers. In this last case, after the film has been put in place, the "telephone number" button is actuated through it, then the normal keypad for the multi-digit telephone number, and finally the "enter" button; for several numbers, this procedure takes place several times. Then, when a call comes in, the answering apparatus automatically dials the stored telephone number, or the sequence of stored numbers, and connects the caller with the number dialed by the answering apparatus; in this way, the caller may not even notice that the called party is, for example, not in the office but at home. What is involved is therefore a quite conventional onward-routing arrangement for telephone calls. There is no suggestion in this published application that such user films be transformed into a set of identical cards which—except for the identification—have only areas for subscribers' names. Each film of the answering apparatus bears different legends and exposes a different selection of keys to be actuated in each case. The cost of such a telephone answering apparatus is also considerably greater than for a dialing arrangement according to the present invention.

Nor does an arrangement for multiple use of operating keys according to West German Offenlegungsschrift No. 34 32270 provide any suggestion of the present invention. According to that disclosure, a single cover plate, manually displaceable but otherwise permanently attached, is used for switching over between a group of ten storage addresses corresponding to the first through ninth pairs of legends and ten other storage addresses corresponding to the second through tenth pairs; at the same time, the signals from the 2×5 repertory buttons disposed on either side of the legends are electromechanically switched over to the respective group of the 20 storage addresses.

It is an object of this invention to provide an improved telephone dialing arrangement wherein dialing by means of a repertory keypad is possible for a virtually unlimited total of numbers at less expense than heretofore.

A further object of the invention is to provide a telephone dialing arrangement having a directory in the form of a set of individually freely movable cards on which the user can enter the telephone numbers, names, or other attributes of important called parties.

Still another object of the invention is to provide a card for use in the telephone dialing arrangement by means of which the repertory dialing button can be pressed through the card at precisely the location where the desired party to be called is entered so that mix-ups between the area corresponding to the desired party and the repertory button actuated no longer occur.

To this end, in the telephone dialing arrangement according to the present invention, of the type initially mentioned, the set consists of a series of individual cards, capable of being handled independently of one another, and the receiving means and the reading device are arranged for the insertion and reading of an individual card of the set simultaneously, likewise the control unit.

The card for use in the foregoing arrangement has a fixed inscription carrier, on the light surface of which a network of lines is printed for bounding the areas, and laid over the inscription carrier is a transparent cover film, the adhesive underside of which is placeable on the surface of the inscription carrier and detachable therefrom a number of times without damage occurring.

Since only the identification of a single, very simple card need be detected in each case, the expenditure necessary for that purpose is so considerably reduced that the needs of new categories of users can be met thereby.

Other objects and advantages of the invention will become apparent from the following detailed description of preferred embodiments thereof, taken in conjunction with the accompanying drawings, in which:

FIG. 2 is a section taken on the line A—A of FIG. 3 through a telephone set and a two-part card in a second embodiment.

FIG. 3 is a top plan view of the bottom part of the card of FIG. 2,

FIG. 4 is a bottom view of the top part of the card of FIG. 2, and

FIGS. 5 and 6 are top plan views of a bottom film for a pressure-sensitive keypad in a first and a second stage of manufacture, respectively.

Figure 1:
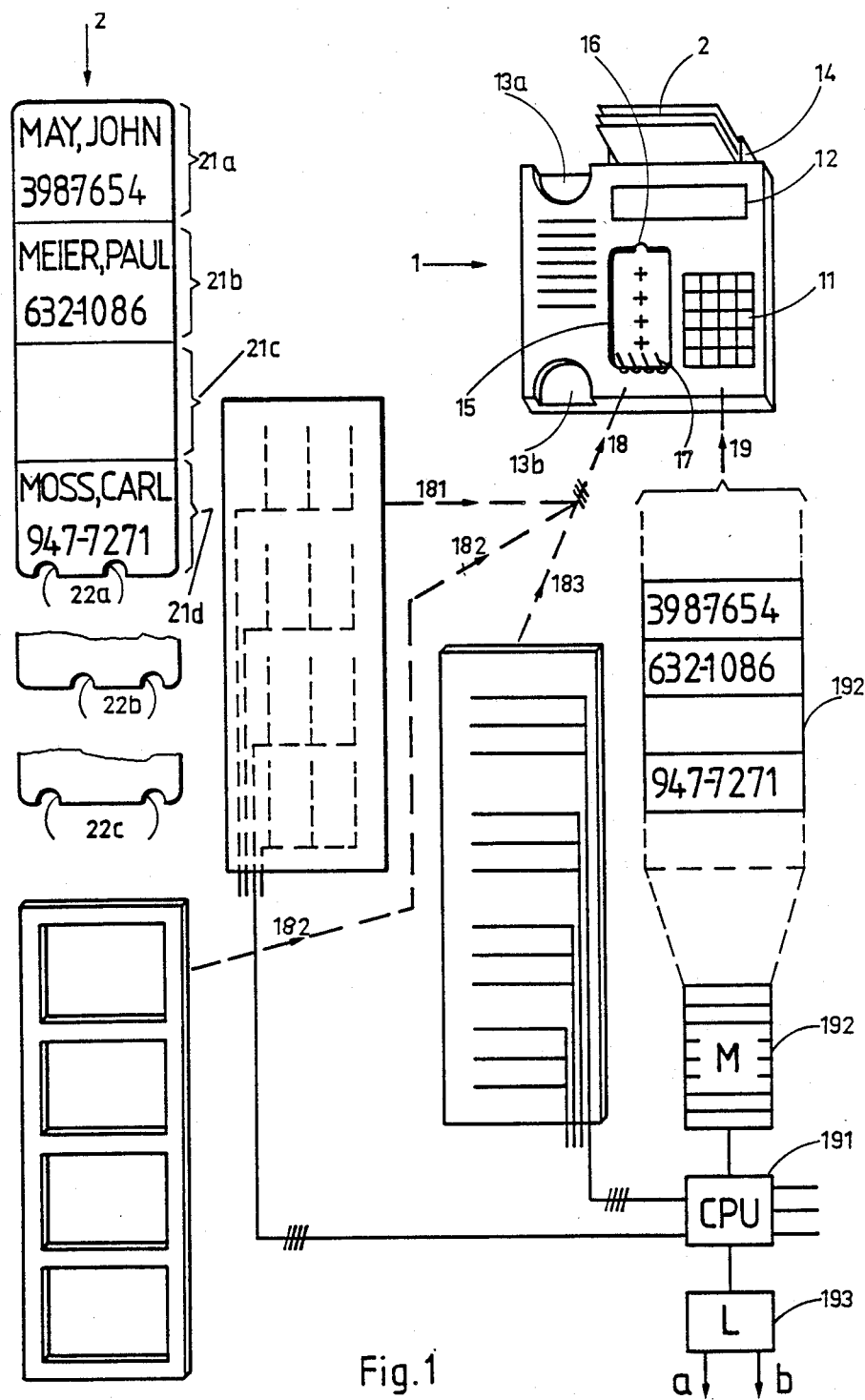
FIG. 1 is an exploded survey diagram, partially in perspective, of a telephone set, card, and circuitry in a first embodiment of the invention.

The telephone dialing arrangement illustrated in FIG. 1 consists of a telephone set 1 and a number of cards 2. Set 1 has the usual number- and control-keypad 11, a display 12, and rests 13a and 13b for a handset (not shown).

Additionally mounted are a compartment 14 for storing a few cards 2 and a flat, upward opening recess 15 in which a card 2 exactly fitting it may be placed. On one of the short sides of recess 15, its vertical edge includes a depression 16 so that the user may easily remove an inserted card 2 with his finger. On the opposite short side are four electro-mechanical feelers 17 for the edge of card 2. Disposed in the bottom of recess 15 are four touch-sensitive repertory buttons 18; their positions are indicated in the drawing by four crosses "+". The three superposed layers of the touch-sensitive pad are depicted in the lower left-hand part of the drawing: a flexible top layer 181 bears on its underside a first conductor pattern; below that is a spacer grid 182, and at the bottom a rigid carrier layer 183 bearing a second conductor pattern. Another electronic circuit 19 is likewise shown in a downwardly exploded view; it may be accommodated in any convenient location in telephone set 1. Circuit 19 contains a central processing unit (CPU) 191, a memory (M) 192, and a line and speech unit (L) 193 for connecting the central office lines a and b to the telephone handset.

The top surface of card 2 is divided by printed lines into four inscribable areas 21a–21d of equal size. This division coincides with the arrangement of the four repertory buttons 18 indicated by the four crosses in recess 15, also perceivable in the conductor patterns of layers 181 and 183 and in the apertures in spacer grid 182. Card 2 is flexible enough so that through it, top layer 181 can be pressed against carrier layer 183 to close the respective repertory button contact. The printed lines and inscriptions on card 2 might also be applied to it by means of an adhesive film.

Varying combinations of two notches representing the binary codes for the numbers 1–15 and matching the spacing of the four feelers 17 in recess 15 are cut into the bottom edges of fifteen cards 2. Three examples are shown as 22a–22d; the other twelve binary-coded cards are not shown. Hence fifteen cards can be provided with individual identification means, so that 60 names and telephone numbers of subscribers can be entered in the four areas 21 per card. Three examples of such entries are shown in the drawing, as well as the respective locations in memory (M) 192 (in an upwardly exploded view on a larger scale) corresponding to inscribed areas 21a, 21b, and 21d, the storage addresses determined by the codes of notches 22a–c being omitted. In this case, memory 192 must have enough storage capacity of 60 subscriber numbers to be dialed.

In this first embodiment, card 2 has been divided into only four areas 21a–d in order not to clutter the drawing; in practice, however, e.g., as in the embodiment of FIGS. 2–6, a card measuring 6×10 cm. is divided into two columns of six areas each, i.e., twelve areas. Thus, with a pack of up to seven cards per telephone set, the requirements of most individuals or households or small businesses for a personal telephone number listing of up to 84 names can be very economically met.

The embodiment of FIGS. 2–6 differs from that of FIG. 1 in other respects as well.

As may be seen in FIG. 2, a composite card 6 comprises a relatively stiff inscription carrier 61 for the user's entries and a transparent cover film 62 adhering thereto. Furthermore, the identification of card 6 is detected by an optical light-barrier arrangement 63, a 3-bit code being sufficient for the aforementioned pack of seven cards per set.

Inscription carrier 61 is made of white paperboard and, as shown in FIG. 3, includes along the network of printed lines 612 bounding areas 611 a rectangular slot 613 for passage of the beams of light barrier 63. As indicated in FIG. 4, cover film 62 has on its top surface a pattern corresponding to the division into areas 611; this pattern consists of lightly tinted sections 621, 622 alternating with non-tinted sections 623, 624. In one set of cards 6, seven different tints may be used for visual differentiation, e.g., in compartment 14 (FIG. 1). The underside of cover film 62 illustrated in FIG. 4 comprises, besides the adhesive coating, a three-part optical code 625, 626, 627—in the present instance, two reflective surfaces 625 and 627 with an absorptive black surface 626 between them.

The adhesive coating is of the kind used on the note slips sold by the 3M Corporation under the registered trademark POST-IT, allowing cover film 62 to be stuck on and pulled off inscription carrier 61 a number of times, e.g., for adding to or modifying the list of telephone numbers on card 6, without causing any damage. This is indicated by a pulled-up portion 62' of cover film 62 shown in broken lines in FIG. 2. Furthermore, the tint 621, 622 is so faint or transparent that when card 6 is assembled, the legends on inscription carrier 61 can still be easily read through it.

The sectional view of FIG. 2 shows part of telephone set 1 or 7, generally constructed according to FIG. 1, with a card 6 in place. The rounded edge 75 of the recess (15 in FIG. 1) is still visible at the left of FIG. 2. As in FIG. 1, a touch-sensitive pad 78 comprises a top layer 781, a spacer grid 782, and a carrier layer 783, but with the particularity that three identical transmitter-receiver units 77 of optical light-barrier arrangement 63 are also accommodated therein. For this purpose, a support plate 751 which forms part of the housing of the telephone set, and by means of which touch-sensitive pad 78 is secured to edge 75 from below, bulges downward. This is necessary because the currently available optical infrared transmitter-receiver units, e.g., of the Honeywell HSR 100 type, take up more depth than touch-sensitive contacts 784, one of which is shown in actuated position. The effect of daylight upon the transmitter-receiver unit is very greatly limited in two ways, viz., by affixing a daylight filter in front of the receivers and by the way in which the transmitter is controlled.

FIGS. 5 and 6 show how, by means of a simple punching operation in carrier layer 783, first a U-shaped cut 785 is made, and then the resultant tongue 786 is bent downward at an angle. It then fits well on support plate 751 when carrier layer 783 is cemented thereto. It is possible that thinner transmitter-receiver units available in the future will make such bent-down portions superfluous. Prior to assembly of touch-sensitive pad 78, transmitter-receiver units 77 are connected by surface-mounted technology at soldered joints 771 to a conductor pattern 787 which, together with a further conductor pattern 788, forms touch-sensitive contact 784. Since top layer 781 is in any case translucent, care need only be taken that no conductor paths of the further conductor pattern 788 interfere with the path of light. This is indicated in FIG. 2 by omission of the hatching.

In this drawing figure, the vertical dimensions are greatly enlarged relative to the horizontal dimensions for purposes of clarity; as a guide, it may be noted that card 6 and touch-sensitive pad 78—not counting the bent-down portion—are each about 0.7 mm. thick. As a result, conditions are favorable for the necessary deflection upon actuation of the repertory buttons. As usual with keypads, a brief tone indicates whether actuation has been properly carried out.

The operations to be performed during manufacture of the telephone dialing arrangements described above, such as punching, pressing, printing, cementing, soldering, etc., largely lend themselves to automation, so that economical mass-production can be set up. Only the card identification must in each case be changed after part of the run, but this is easily programmable for the respective robots of the production line.

Operation of such a dialing arrangement is easy to learn. It comprises the following steps:

A. To store new telephone numbers listed on cards 2, 6:
 1. release line a, b if busy, i.e., replace the handset on rests 13a, b;
 2. place card 2, 6 in recess 15, 615; feelers 17 or light barriers 63 detect the card identification corresponding to notches 22a, b, c or reflective surfaces 625, 627 and thereby cause a specific location in the main memory 192 to be addressed;
 3. press the new area 21a–d or 61 to be stored: the corresponding storage location is addressed by means of the repertory button 18, 784 situated under the area;
 4. if any telephone number has already been stored there, it appears in display 12, and no further steps need be taken;
 5. if no telephone number is displayed, enter the new telephone number by means of keypad 11 and store it by pressing a control button.

B. To dial a telephone number stored in memory 192:
 1. place card 2, 6 in recess 15, 615;
 2. pick up the handset to get line a, b;
 3. when the dial tone is heard, press the area to be dialed; the rest takes place automatically.

Here, too, display 12 is used to monitor the operation.

In particular cases, the invention may also be carried out in other ways. Thus, the repertory buttons may be disposed to one side of the recess, whereby simple, not specially flexible cards having optical or other identification may be used. This identification may be placed on other surfaces or locations of the card than described above, as may a tint. For reasons of brevity, such modifications are not portrayed in detail.

What is claimed is:

1. A telephone dialing arrangement for the automatic dialing of previously stored telephone numbers, of the type having a plurality of data carriers in the form of individual discrete cards, each of the data carriers including a plurality of predetermined areas for inscription of data and individually distinctive machine readable identification means, a telephone set having receiving means for receiving at lest one of the data carriers, a plurality of repertory buttons, reading means, electronic memory means having at least as many storage locations as the sum of all the areas on the data carriers, the addresses of the storage locations being determined by the identification means and by signals transmitted by the repertory buttons, control means including a line unit and a speech unit for controlling reading, storage, dialing, and speech operations, means for causing said receiving means and said reading means simultaneously to receive and read any single one of said cards, means for causing said control means to act simultaneously with said receiving means and said reading means, said receiving means comprising an upwardly open recess having a bottom, said recess bottom having a top layer of material, a bottom layer of material, a spacer grid and a plurality of optical transmitter-receivers disposed between said top layer and said bottom layer, the spatial arrangement of said transmitter-receivers matching the spatial arrangement of said identification means on said cards, and said top layer of material including at least one translucent portion adjacent to said transmitter-receivers.

2. The dialing arrangement of claim 1, wherein the spatial layout of the repertory buttons and reading means match the spatial arrangement of the areas and the identification means on the respective data carriers relative to the receiving means, and said repertory buttons being disposed in said recess bottom so that one of said repertory buttons is situated behind and within the bounds of each of said areas when any single one of said cards is placed in said recess.

3. The dialing arrangement of claim 2 wherein said recess bottom takes the form of a touch-sensitive keypad.

4. A card for use in a telephone dialing arrangement, comprising a fixed inscription carrier having a light surface and a network of lines printed thereon for bounding predetermined areas and a transparent cover film, wherein said cover film includes a pattern of optically reflective and/or absorptive identification surfaces.

5. the card of claim 4, wherein said film has an adhesive underside intended for multiple attachment to and removal from said inscription carrier without damage.

6. The card of claim 5, wherein said inscription carrier includes a light aperture at a location corresponding to said pattern, and which is disposed along one of said lines of said network.

* * * * *